(12) United States Patent
Jaliwala et al.

(10) Patent No.: US 6,508,242 B2
(45) Date of Patent: Jan. 21, 2003

(54) SYSTEM FOR ESTIMATING ENGINE EXHAUST TEMPERATURE

(75) Inventors: Salim A. Jaliwala, Columbus, IN (US); Paul R. Miller, Columbus, IN (US); Larry J. Brackney, Columbus, IN (US); Thomas A. Dollmeyer, Columbus, IN (US); John F. Wright, Columbus, IN (US); Gary L. Hunter, Eagle, WI (US)

(73) Assignee: Cummins, Inc., Columbus, IN (US)

( * ) Notice: Subject to any disclaimer, the term of this patent is extended or adjusted under 35 U.S.C. 154(b) by 66 days.

(21) Appl. No.: 09/774,664

(22) Filed: Jan. 31, 2001

(65) Prior Publication Data
US 2002/0100467 A1 Aug. 1, 2002

(51) Int. Cl.[7] .............................................. F02D 41/00
(52) U.S. Cl. .......................................... 123/676; 73/116
(58) Field of Search ................................ 123/676, 494, 123/501; 73/116

(56) References Cited

U.S. PATENT DOCUMENTS

| | | | |
|---|---|---|---|
| 4,223,654 A | 9/1980 | Wessel et al. | |
| 4,811,223 A | 3/1989 | Iwatsuki et al. | |
| 5,225,982 A | 7/1993 | Ito et al. | |
| 5,278,762 A | 1/1994 | Kawamura | |
| 5,303,168 A | 4/1994 | Cullen et al. | |
| 5,544,639 A | 8/1996 | Shouda et al. | |
| 5,609,218 A | 3/1997 | Yamashita et al. | |
| 5,647,668 A | 7/1997 | Schanibel et al. | |
| 5,698,776 A | 12/1997 | Tomisawa | |
| 5,845,627 A | 12/1998 | Olin et al. | |
| 6,012,431 A | 1/2000 | Itoyama et al. | |
| 6,035,640 A | 3/2000 | Kolmanovsky et al. | |
| 6,059,057 A | 5/2000 | Yamazaki et al. | |
| 6,098,602 A | 8/2000 | Martin et al. | |
| 6,116,211 A | 9/2000 | Suzuki et al. | |
| 6,363,312 B1 * | 3/2002 | Griffin | 123/676 |
| 6,390,081 B1 * | 5/2002 | Novak et al. | 123/676 |
| 6,397,820 B1 * | 6/2002 | Novak et al. | 123/480 |

FOREIGN PATENT DOCUMENTS

DE 43 25 307 A1 2/1995

* cited by examiner

Primary Examiner—John Kwon
(74) Attorney, Agent, or Firm—Barnes & Thornburg

(57) ABSTRACT

A system is provided for estimating engine exhaust temperature in accordance with an exhaust temperature model based on a number of engine operating parameters. In one embodiment, the engine exhaust temperature model is based on current values of engine speed, intake manifold temperature, mass charge flow, default fuel command parameters, and a first set of model constants. In an alternative embodiment, the engine exhaust temperature model is based on current values of engine speed, intake manifold temperature, intake manifold pressure, mass charge flow, default fueling parameters, and a second set of model constants including a lower heating value of fuel constant.

16 Claims, 5 Drawing Sheets

SYSTEM FOR ESTIMATING ENGINE EXHAUST TEMPERATURE

FIELD OF THE INVENTION

The present invention relates generally to fuel limiting strategies for internal combustion engines, and more specifically to such systems for controlling engine exhaust temperatures during engine operation.

BACKGROUND OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass-of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold. valve, for controllably introducing exhaust gas to the intake manifold. Through the use of an on-board microprocessor, control of the EGR valve is typically accomplished as a function of information supplied by a number of engine operational sensors.

While EGR systems of the foregoing type are generally effective in reducing unwanted emissions resulting from the combustion process, a penalty is paid thereby in the form of a resulting loss in engine efficiency. A trade-off thus exists in typical engine control strategies between the level of $NO_x$ production and engine operating efficiency, and difficulties associated with managing this trade-off have been greatly exacerbatedby the increasingly stringent requirements of government-mandated emission standards.

In order to achieve the dual, yet diametrically opposed, goals of limiting the production of $NO_x$ emissions to acceptably low levels while also maximizing engine operational efficiency under a variety of load conditions, substantial effort must be devoted to determining with a high degree of accuracy the correct proportions of air, fuel and exhaust gas making up the combustion charge. To this end, accurate, real-time values of a number of EGR system-related operating parameters must therefore be obtained, preferably at low cost. Control strategies must then be developed to make use of such information in accurately controlling the engine, EGR system and/or turbocharger. The present invention is accordingly directed to techniques for controlling engine operation to maintain engine exhaust temperatures within desired operating limits.

SUMMARY OF THE INVENTION

The foregoing shortcomings of the prior art are addressed by the present invention. In accordance with one aspect of the present invention, a system for determining engine exhaust temperature comprises a temperature sensor producing a temperature signal corresponding to a temperature of an intake manifold of an internal combustion, an engine speed sensor producing an engine speed signal corresponding to a rotational speed of the engine, means for determining a charge flow value corresponding to a mass flow of charge entering the intake manifold; and a control circuit producing a fueling command for fueling the engine, the control circuit responsive to the fueling command, the temperature signal, the engine speed signal and the charge flow value to estimate an engine exhaust temperature.

In accordance with still another aspect of the present invention, a method for determining engine exhaust temperature comprises determining a temperature of an intake manifold of an internal combustion engine, determining a rotational speed of the engine, determining a mass flow of charge entering the intake manifold, determining a fueling command for supplying fuel to the engine, and estimating an engine exhaust temperature based on current values of the fueling command, the temperature, the rotational speed and the mass flow.

One object of the present invention is to provide a virtual sensor operable to estimate engine exhaust temperature based on existing engine operational information.

Another object of the present invention is to provide a model-based strategy for estimating engine exhaust temperature.

These and other objects of the present invention will become more apparent from the following description of the preferred embodiments.

DESCRIPTION OF THE PREFERRED EMBODIMENTS

Figure 1:
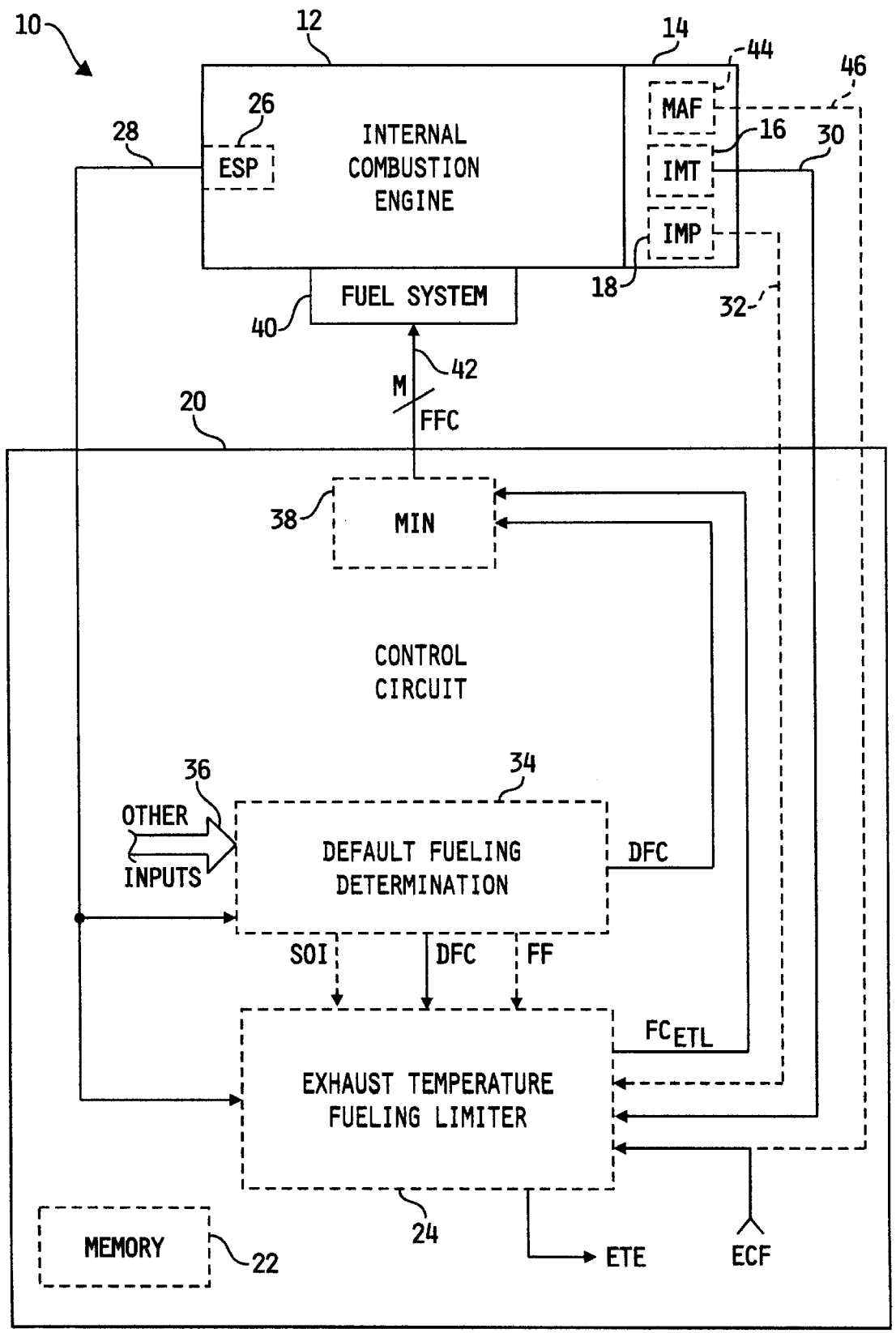
FIG. 1 is a diagrammatic illustration of one preferred embodiment of a system for controlling engine exhaust temperature, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for controlling engine exhaust temperature, in accordance with the present invention, is shown. System 10 includes an internal combustion engine 12 having an intake manifold 14 coupled thereto. An intake manifold temperature sensor 16 is disposed within, or otherwise disposed in fluid communication with, manifold 14. Sensor 16 is preferably a temperature sensor of known construction that is operable to sense the temperature within the intake manifold 14 and produce an intake manifold temperature (IMT) signal corresponding thereto. Manifold 14 may optionally include an intake manifold pressure sensor 18 is disposed therewithin, or otherwise disposed in fluid communication therewith, wherein sensor 16 is preferably of known construction and operable to sense a pressure within manifold 14 and produce an intake manifold pressure (IMP) signal corresponding thereto.

Engine 12 includes an engine speed sensor 26 operable to sense rotational speed of the engine 12 and produce an engine speed (ESP) signal corresponding thereto. Preferably, sensor 26 is of known construction, and in one embodiment sensor 26 is a Hall effect sensor operable to sense passage thereby of a number of teeth forming part of a gear or tone wheel. Alternatively, sensor 26 may be a variable reluctance sensor or other known speed sensor, and in any case sensor 26 is operable to produce an engine speed signal indicative of engine rotational speed.

Engine 12 further includes a fuel system 40 responsive to one or more final fuel commands (FFC) to supply fuel to engine 12. Fuel system 40 is preferably an electronically controlled fuel system of known construction, wherein the operation thereof is generally known in the art.

Central to system 10 is a control circuit 20 that is preferably microprocessor-based and is generally operable to control and manage the overall operation of engine 12. Control circuit 20 includes a memory unit 22 as well as a number of inputs and outputs for interfacing with various sensors and systems coupled to engine 12, such as those just described hereinabove. Control circuit 20, in one embodiment, may be a known control unit sometimes referred to as an electronic or engine control module (ECM), electronic or engine control unit (ECU) or the like, or may alternatively be any control circuit capable of operation as will be described in greater detail hereinafter. In any case, control circuit 20 includes a default fueling block 34 receiving the engine speed signal (ESP) from engine speed sensor 26 via signal path 28, as well as a number of additional input signals 36. Block 34 is responsive to the ESP signal on signal path 28 as well as-one or more of the additional signals 36 to compute a default is fueling command (DFC) in accordance with techniques well-known in the art. The default fueling command DFC may be an unrestricted fueling command that is used as the final fueling command FFC produced on any number, M, of signal paths 42 for controlling fuel system 40, wherein M may be any positive integer. As it relates to the present invention, however, the default fueling determination block 34 may alternatively or additionally include one or more fuel limiting algorithms designed to achieve certain engine operational goals, wherein the default fueling command DFC produced by block 34 represents an unrestricted fueling command that has been limited by one or more such fuel limiting algorithms.

In accordance with the present invention, control circuit 20 further includes an exhaust temperature fueling limiter block 24 receiving the engine speed signal (ESP) from engine speed sensor 26 via signal path 28, the intake manifold temperature signal (IMT) from the intake manifold temperature sensor 16 via signal path 30, optionally the intake manifold pressure signal (IMP) from intake manifold pressure sensor 18 via signal path 32, and the default fueling command (DFC) from the default fueling determination block 34. In a general sense, the default fueling command (DFC) typically includes timing information relating to the start-of-injection (SOI) and fuel quantity information relating to mass fuel flow (FF), as these terms are understood to those skilled in the art. In one preferred embodiment, the default fueling determination block 34 is configured to supply the exhaust temperature fueling limiter block 24 with the default fueling command (DFC), and block 24 is operable to determine from DFC the values of SOI and FF in a manner known in the art. Alternatively, the default fueling determination block 34 may be configured to supply the exhaust temperature fueling limiter block 24 with the SOI and/or FF values directly, wherein block 24 is operable to process either one, or both, of these values in a manner to be more fully described hereinafter.

In addition to the fueling information supplied by the default fueling determination block 34, the engine speed signal (ESP), the intake manifold temperature signal (IMT), =and optionally the intake manifold pressure signal (IMP), the exhaust temperature fueling limiter block 24 is configured to receive a mass charge flow value (ECF). In one preferred embodiment, the mass charge flow value (ECF) is supplied by a known software algorithm operable to compute a charge flow estimate based on certain engine operating parameter values, although the present invention contemplates that intake manifold 14 may alternatively include a mass air flow sensor (MAF) 44 of known construction supplying a charge flow value to block 24 as shown in phantom. In cases where the charge flow value (ECF) is estimated in accordance with a known estimation algorithm, one preferred embodiment of control circuit 20 includes a charge flow determination block of the type illustrated in FIG. 2.

Figure 2:
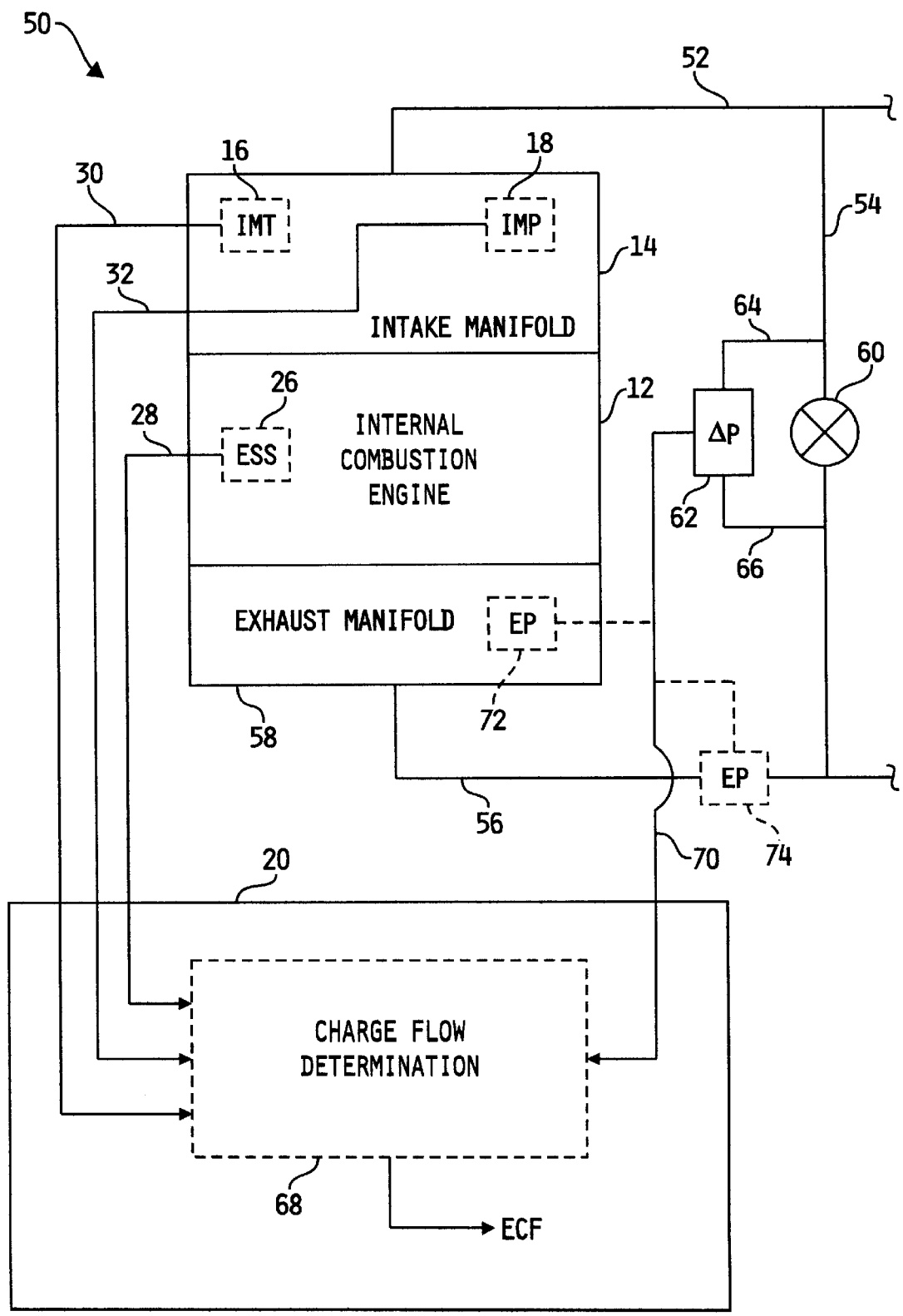
FIG. 2 is a diagrammatic illustration of one preferred embodiment of a technique for determining a charge flow parameter for use by the exhaust temperature fueling limiter block of FIG. 1.

Referring to FIG. 2, a system 50 is shown for estimating charge flow; i.e., the mass flow of charge supplied to intake manifold 14, wherein the term "charge", as used herein, is defined as a composition of fresh air and recirculated exhaust gas. In any case, system 50 includes several components in common with system 10 of FIG. 1, and like numbers are therefore used to identify like components.

System 50 includes an internal combustion engine 12 having an intake manifold 14 fluidly coupled to an intake conduit 16, wherein intake manifold 14 receives fresh air via conduit 16. In exhaust manifold 58 of engine 12 expels exhaust gas to ambient via exhaust conduit 56, and an EGR valve 60 is disposed in fluid communications with the intake and exhaust conduits 16 and 58 respectively via conduit 54. A $\Delta P$ sensor 62 is positioned across the EGR valve 60 and is electrically connected to a charge flow determination block 68 of control circuit 20 via signal path 70, and an engine speed sensor 28 electrically connected to block 68 via signal path 28. An intake manifold temperature sensor (IMT) 16 is disposed in fluid communication with the intake manifold 14 of engine 12, and is electrically connected to the charge flow determination block 68 of control circuit 20 via signal path 30. Intake manifold 14 also includes an intake manifold pressure sensor (IMP) 18 in fluid communication therewith and electrically connected to the charge flow determination block 68 of control circuit 20 via signal path 32. Optionally, as will be described in greater detail hereinafter, system 50 may include an exhaust pressure sensor (EP) 72 disposed in fluid communication with the exhaust manifold 58 or an exhaust pressure sensor (EP) 74 disposed in fluid communication with exhaust conduit 56 as shown in phantom in FIG. 2.

In one preferred embodiment, the charge flow determination block 68 of the control circuit 20 is operable to compute an estimate of the mass charge flow (ECF) into intake manifold 14 by first estimating the volumetric efficiency (ηv) of the charge intake system, and then computing ECF as a function of $\eta_v$ using a conventional speed/density equation. Any known technique for estimating ηv may be used, and in one preferred embodiment of block 68 ηv is computed according to a known Taylor mach number-based volumetric efficiency equation given as:

$$\eta_v = A_1 * \{(Bore/D)^2 * (stroke*ESP)^B / sqrt(\gamma*R*IMT) * [(1+EP/IMP) + A_2]\} + A_3,$$

where, $A_1, A_2, A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, γ and R are known constants (γ*R=387.414 KJ/kg/deg K), ESP is engine speed, IMP is the intake manifold pressure, EP is the exhaust pressure, where EP=IMP+ΔP, and IMT=intake manifold temperature.

From the foregoing equation, it should be apparent that system 50 may substitute an exhaust pressure sensor 72 or 74, as shown in phantom in FIG. 2, for the ΔP sensor 62, although commercially available exhaust pressure sensors that are capable of withstanding harsh environments associated with the exhaust manifold 58 and/or exhaust conduit 56 are not typically available. For purposes of the present invention, a ΔP sensor 62 is therefore preferably used.

With the volumetric efficiency value ηv estimated according to the foregoing equation, the estimate charge flow value ECF is preferably computed according to the equation:

$$ECF = \eta_v \cdot V_{DIS} * ESP * IMP / (2*R*IMT),$$

where, $\eta_v$ is the estimated volumetric efficiency, $V_{DIS}$ is engine displacement and is generally dependent upon engine geometry, ESP is engine speed, IMP is the intake manifold pressure, R is a known gas constant (R=54), and IMT is the intake manifold temperature.

Referring again to FIG. 1, the exhaust temperature fueling limiter block 24 preferably includes a model for estimating engine exhaust temperature (ETE), in accordance with one aspect of the present invention, wherein the engine exhaust temperature estimate is preferably a function of at least the ESP, IMT, ECF and DFC (or SOI and FF) values, and optionally the IMP value. While the engine exhaust temperature model is preferably provided in the form of an equation stored within block 24 or memory unit 22, the present invention contemplates that the model may alternatively be provided in the form of one or more graphical representations, tables, and/or the like. In any case, the exhaust temperature fueling limiter block 24 is preferably operable to compute a model-based engine exhaust temperature estimate (ETE) for use in accordance with other aspects of the present invention, and/or for use by other algorithms and/or control strategies within control circuit 20.

In accordance with another aspect of the present invention, the exhaust temperature fueling limiter block 24 is further operable to compute an engine exhaust temperature-limited fueling command value ($FC_{ETL}$) as a function of the engine exhaust temperature estimation model. The exhaust temperature-limited fueling command $FC_{ETL}$ is preferably a function of the default fueling command (DFC) that is limited by block 24 as a function of an imposed maximum exhaust temperature limit ($T_{EL}$) according to the exhaust temperature estimation model of the present invention, as will be described in greater detail hereinafter. In any case, the default fueling command (DFC) produced by the default fueling determination block 34 and the engine exhaust temperature-limited fueling command $FC_{ETL}$ produced by the exhaust temperature fueling limiter block 24 are both provided to a MIN block 38 operable to produce as the final fueling command FFC on signal path 42 a minimum value thereof.

Figure 7:
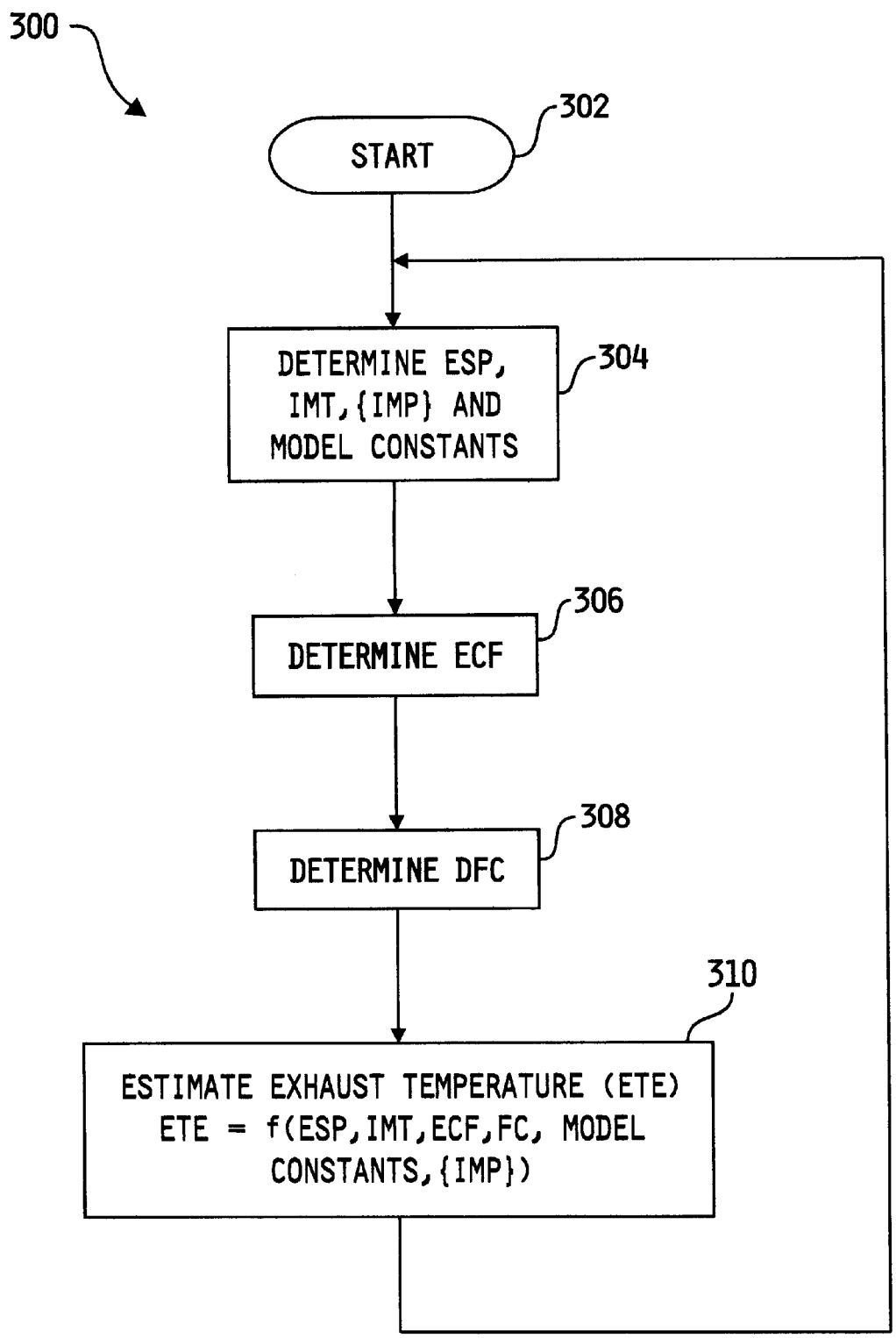
FIG. 7 is a flowchart illustrating one preferred embodiment of a software algorithm for estimating engine exhaust temperature, in accordance with the present invention.

Referring now to FIG. 7, a flowchart illustrating one preferred embodiment of a software algorithm 300 for estimating engine exhaust gas temperature (ETE), in accordance with the present invention, is shown. Algorithm 300 is preferably stored within limiter block 24 and is executable by control circuit 20 to produce the exhaust temperature estimate (ETE). Algorithm 300 begins at step 302, and at step 304, control circuit 20 is operable to determine current values of engine speed (ESP), intake manifold temperature (IMT) and model constants. In a first embodiment of the present invention, block 24 is operable to estimate engine exhaust temperature (ETE) according to the model:

$$ETE = IMT + A + (B*SOI) + C/(ECF/FF) + (D*SOI)/ESP + E/[(ESP*ECF)/FF] \quad (1),$$

wherein the model constants determined at step 304 correspond to constants A, B, C, D and E in equation (1). In a second embodiment of the present invention, control circuit 20 is further operable at step 304 to determine a current value for the intake manifold pressure (IMP). In this second embodiment, block 24 is operable to estimate engine exhaust temperature (ETE) according to the model:

$$ETE = IMT + [(A*ESP) + (B*IMP) + (C*SOI) + D][(LHV*FF)/ECF] \quad (2),$$

wherein the model constants determined at step 304 correspond to constants A, B, C, and D in equation (2). In this embodiment, equation (2) includes an additional lower heating value of fuel (LHV) constant, which is a known constant depending upon the type of fuel used by engine 12. Regardless of whether equation (1) or (2) is used, the model constants A–E of equation (1) or A–D of equation (2) are preferably obtained as a result of one or more known data fitting techniques operable to optimize a fit between available performance data and the respective model.

In any case, algorithm 300 advances from step 304 to step 306 where control circuit 20 is operable in each of the above-described embodiments to determine a mass charge flow value (ECF). In one preferred embodiment, ECF is obtained in accordance with a known charge flow estimation algorithm such as that described with respect to FIG. 2. Alternatively, ECF may be obtained from an actual sensor such as the optional mass air flow sensor 44 shown in phantom in FIG. 1. In either case, algorithm 300 advances from step 306 to step 308 where control circuit 20 is operable in each of the model embodiments illustrated in equations (1) and (2) to determine a default fueling command (DFC). In one preferred embodiment, DFC is provided by the default fueling determination block 34, and block 24 is operable to determine start-of-injection (SOI) and mass fuel flow (FF) values therefrom in accordance with well-known techniques therefore. Alternatively, the default fueling determination block 34 is operable to provide the SOI and FF values directly to block 24. In either case, algorithm execution advances from step 308 to step 310 where block 24 is operable to compute an estimate of the engine exhaust temperature (ETE) according to either equation (1) or equation (2). Thereafter, algorithm execution preferably loops back to step 304 for continuous determination of ETE, but may alternatively return from step 310 to another calling routine.

Exhaust temperature estimation equation (1) is, in accordance with the present invention, based on a statistical sensitivity approach, and is believed to provide sufficiently accurate results for many applications. Exhaust temperature estimation equation (2) is, in accordance with the present invention, based on a model that assumes that a fraction of the fuel energy is transferred to the engine exhaust. Test data has indicated that the engine exhaust temperature estimation model represented by equation (2) is more accurate, is less sensitive to uncertainties, and is less sensitive to deterioration effects than the model represented by equation (1).

Figure 3:
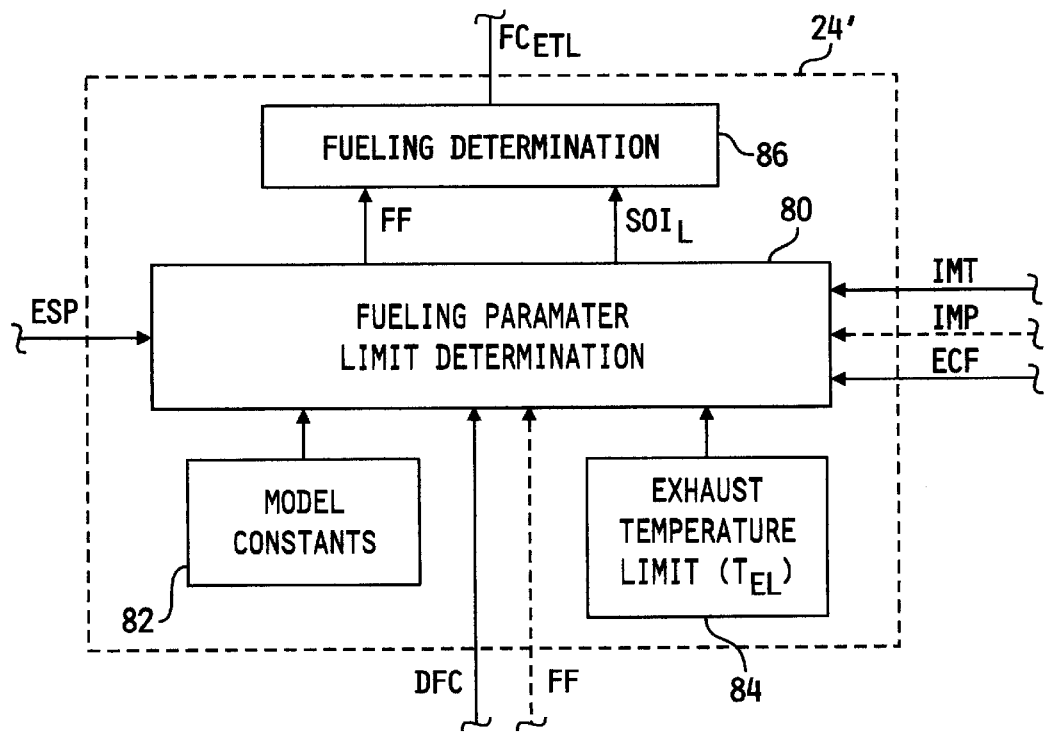
FIG. 3 is a diagrammatic illustration of one preferred embodiment of the exhaust temperature fueling limiter block of FIG. 1, in accordance with the present invention.

Referring now to FIG. 3, one preferred embodiment 24' of the exhaust fueling determination block 24 of FIG. 1 for producing an exhaust temperature-limited fueling command (FCETL), in accordance with the present invention, is shown. In the embodiment of block 24' illustrated in FIG. 3, a fueling parameter limit determination block 80 receives input signals ESP and IMT (and optionally IMP) from associated sensors described with respect to FIG. 1. Block 80 also receives the mass charge flow value ECF either from the estimation algorithm described with respect to FIG. 2 or from a mass air flow sensor as described with respect to FIG. 1, and further receives either the default fueling command value (DFC) or the mass fuel flow value (FF) from the default fueling determination block 34. In one preferred embodiment, block 80 is operable to determine the mass fuel flow value FF from the default fueling command DFC in accordance with known techniques, and in this embodiment block 80 is thus configured to receive DFC from block 34. Alternatively, as shown in phantom in FIG. 3, block 34 may be configured to supply FF directly to block 80 in which case the default fueling command DFC need not be provided.

Block 24' further includes a model constants block 82 having the various model constants stored therein, wherein block 82 is operable to provide such constants to block 80. In embodiments utilizing equation (1) as the engine exhaust temperature model, block 82 includes model constants A, B, C, D and E thereof, and in embodiments utilizing equation (2), block 82 includes model constants A, B, C and D, as well as the lower heating value of fuel constant LHV, thereof. Block 24' further includes an exhaust temperature limit block 84 having an exhaust temperature limit value ($T_{EL}$) stored therein, wherein block 84 is operable to supply $T_{EL}$ to the fueling parameter limit determination block 80. Preferably, $T_{EL}$ is a programmable value, and in any case represents a maximum allowable limit for the engine exhaust temperature.

In accordance with the present invention, the fueling parameter limit determination block 80 is responsive to the various input signals and values to compute a limited start-of-injection value ($SOI_L$) based on either of the engine exhaust temperature estimation models represented in equations (1) and (2), and to provide the $SOI_L$ value along with the mass fuel flow value FF to a fueling determination block 86. Fueling determination block 86 is responsive to the $SOI_L$ and FF values to compute an exhaust temperature-limited fueling command value ($FC_{ETL}$), using known equations therefore, and to provide $FC_{ETL}$ to the MIN block 38 of FIG. 1.

In the embodiment illustrated in FIG. 3, the exhaust temperature fueling limiter block 24' is operable to limit the default start-of-injection value SOI to a limited value $SOI_L$, based on a desired exhaust temperature limit value $T_{EL}$ and on either of the engine exhaust temperature estimation models represented by equations (1) and (2). The $SOI_L$ value and the mass fuel flow value FF are then recombined at the fueling determination block 86 to produce the exhaust temperature-limited fueling command value $FC_{ETL}$. The minimum value of the exhaust temperature-limited fueling command $FC_{ETL}$ and the default fueling command DFC is produced by control circuit 20 as the final fueling command FFC on signal path 42. The fuel system 40 is responsive to the final fueling command FFC to correspondingly supply fuel to engine 12, and the temperature of engine exhaust is thereby limited to a maximum value of $T_{EL}$.

Figure 4:
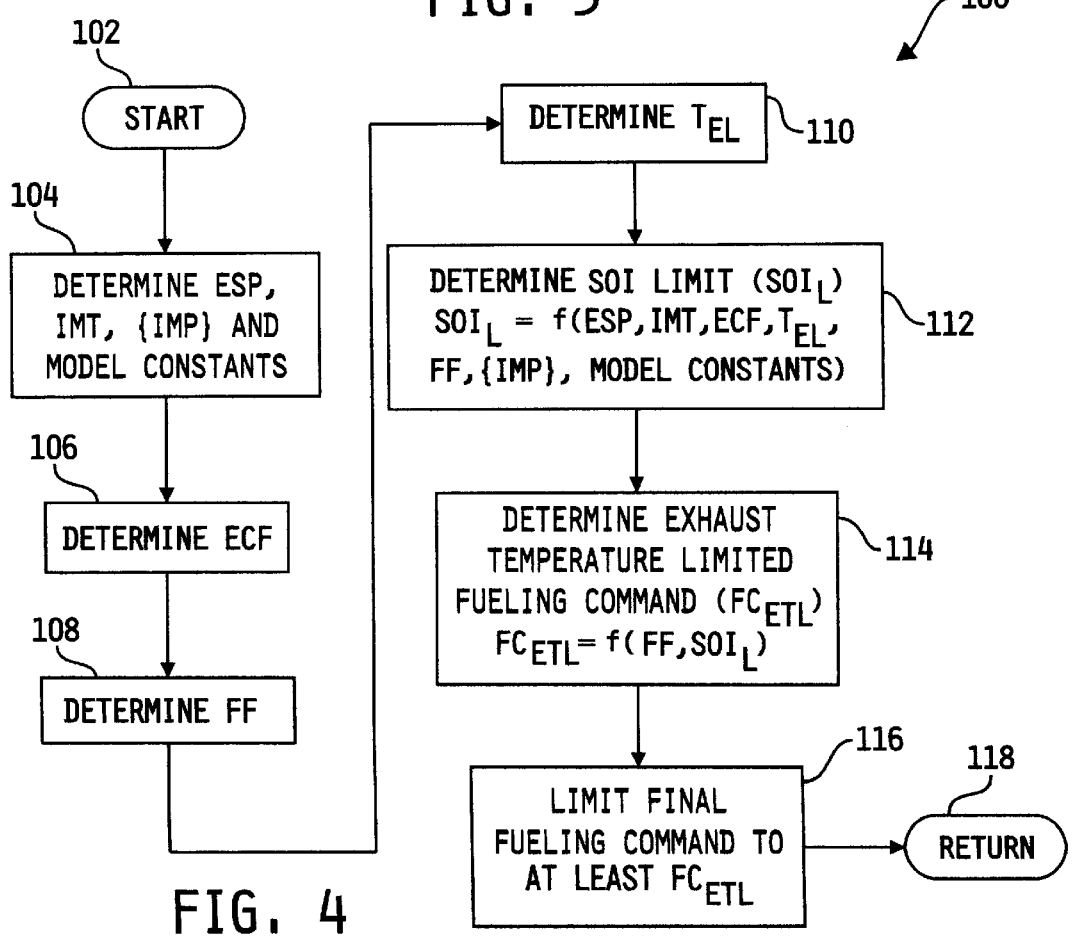
FIG. 4 is a flowchart illustrating one preferred embodiment of a software algorithm for controlling exhaust gas according to the exhaust temperature fueling limiter embodiment shown in FIG. 3.

Referring now to FIG. 4, one preferred embodiment of a software algorithm 100 for carrying out the concepts illustrated and described with respect to FIG. 3, is shown. Algorithm 100 begins at step 102, and thereafter at step 104 the fueling parameter limit determination block 80 is operable to determine ESP and IMT (and optionally IMP) from the respective sensors, and to determine the model constants from block 82. In embodiments utilizing the engine exhaust temperature estimate model of equation (1), the model constants preferably include constants A, B, C, D and E thereof. Conversely, in embodiments utilizing the engine exhaust temperature estimate model of equation (2), the model constants preferably include constants A, B, C and D, as well as the lower heating value of fuel constant LHV thereof. In any case, algorithm execution advances from step 104 to step 106 where block 80 is operable to receive the mass charge flow value ECF either from a charge flow estimation algorithm such as that illustrated in FIG. 2, or from a mass air flow sensor such as sensor 44 shown in phantom in FIG. 1. Algorithm execution advances from step 106 to step 108 where the fueling parameter limit determination block 800 is operable to determine the default mass fuel flow value FF. In one embodiment, block 80 is operable at step 106 to receive FF directly from the default fueling determination block 34 as shown in phantom in FIG. 3. Alternatively, block 80 may be operable at step 106 to receive the default fueling value DFC from block 34 and compute FF therefrom using known techniques therefore. Thereafter at step 110, the fueling parameter limit determination block 80 is operable to determine an exhaust temperature limit $T_{EL}$, preferably by receiving $T_{EL}$ from block 84.

Following step 110, algorithm execution advances to step 112 where the fueling parameter limit determination block 80 is operable to determine the start-of-injection limit $SOI_L$ as a function of the various input signals and values thereto.

In embodiments where the engine exhaust temperature is estimated in accordance with equation (1), the estimated exhaust temperature value ETE is preferably replaced with the exhaust temperature limit $T_{EL}$, and equation (1) is solved for $SOI_L$, resulting in the equation:

$$SOI_L = \{T_{EL} - IMT - A - C/(ECF/FF) - E/[ESP*(ECF/FF)]\}/(B + D/ESP) \quad (3).$$

In embodiments where the engine exhaust temperature is estimated in accordance with equation (2), the estimated exhaust temperature value ETE is preferably replaced with the exhaust temperature limit $T_{EL}$, and equation (2) is solved for $SOI_L$, resulting in the equation:

$$SOI_L = \{[(T_{EL} - IMT)/(C*LHV)]*(ECF/FF)\} - (A*ESP)/C - (B*IMP)/C - D/C \quad (4).$$

In either case, algorithm execution advances from step 112 to step 114 where block 86 is operable to determine an exhaust temperature-limited fueling command $FC_{ETL}$ as a function of FF and $SOI_L$, using known techniques therefore. Thereafter at step 116, control circuit 20 is operable to limit the final fueling command FFC to a fueling command no greater than $FC_{ETL}$ to thereby limit the actual engine exhaust temperature to values no greater than $T_{EL}$. Algorithm execution advances from step 116 to step 118 where algorithm 100 is returned to its calling routine.

Figure 5:
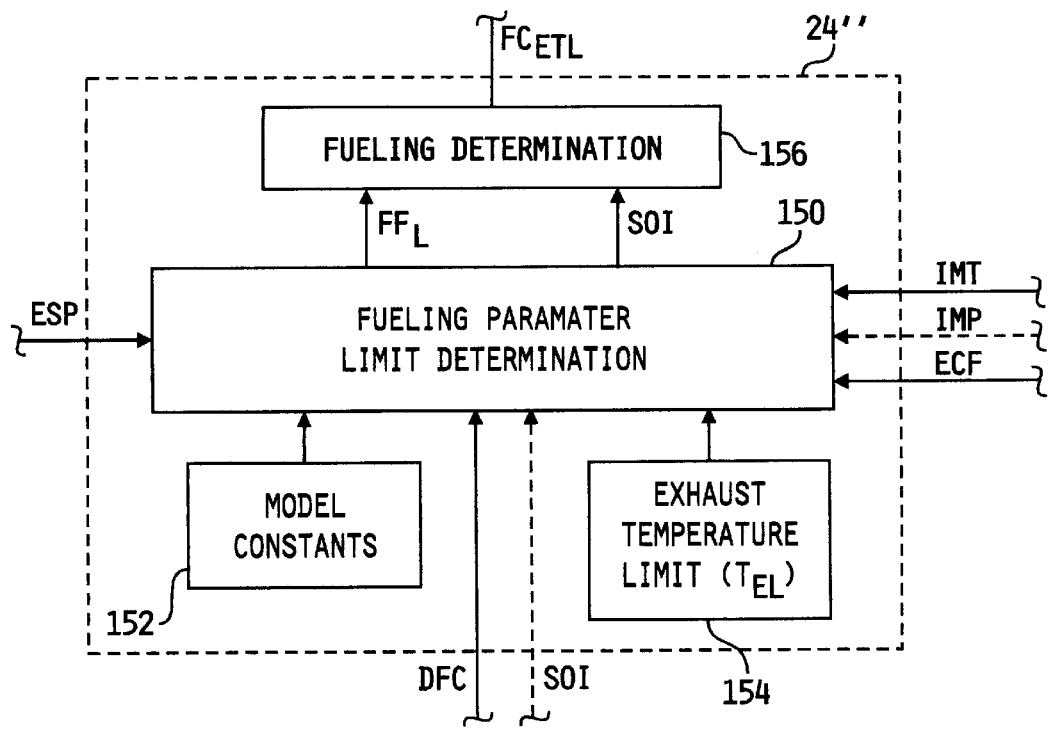
FIG. 5 is a diagrammatic illustration of an alternate embodiment of the exhaust temperature fueling limiter block of FIG. 1, in accordance with the present invention.

As an alternative to controlling the final fueling command FFC as a function of a start-of-injection limit value $SOI_L$ as just described, the present invention contemplates instead limiting FFC as a function of a mass fuel flow limit value $FF_L$. Referring to FIG. 5, an alternate embodiment 24" of the exhaust temperature fueling determination block 24, in accordance with the present invention, is therefore shown wherein block 24" is operable to compute the exhaust temperature-limited fueling command $FC_{ETL}$ as a function of a mass fuel flow limit $FF_L$ and of the default start-of-injection value SOI. In the embodiment of block 24" illustrated in FIG. 5, a fueling parameter limit determination block 150 receives input signals ESP and IMT (and optionally IMP) from associated sensors described with respect to FIG. 1. Block 150 also receives the mass charge flow value ECF either from the estimation algorithm described with respect to FIG. 2 or from a mass air flow sensor as described with respect to FIG. 1, and further receives either the default fueling command value (DFC) or the start-of-injection value (SOI) from the default fueling determination block 34. In one preferred embodiment, block 150 is operable to determine the start-of-injection value SOI from the default fueling command DFC in accordance with known techniques, and in this embodiment block 150 is thus configured to receive DFC from block 34. Alternatively, as shown in phantom in FIG. 5, block 34 may be configured to supply SOI directly to block 150 in which case the default fueling command DFC need not be provided.

Block 24" further includes a model constants block 152 having the various model constants stored therein, wherein block 152 is operable to provide such constants to block 150. In embodiments utilizing equation (1) as the engine exhaust temperature model, block 152 includes model constants A, B, C, D and E thereof, and in embodiments utilizing equation (2), block 152 includes model constants A, B, C and D, as well as the lower heating value of fuel constant LHV, thereof. Like block 24" of FIG. 3, block 24" further includes an exhaust temperature limit block 154 having an exhaust temperature limit value ($T_{EL}$) stored therein, wherein block 154 is operable to supply $T_{EL}$ to the fueling parameter limit determination block 150. Preferably, $T_{EL}$ is a programmable value, and in any case represents a maximum allowable limit for the engine exhaust temperature.

In accordance with the present invention, the fueling parameter limit determination block 150 is responsive to the various input signals and values to compute a limited mass fuel flow value ($FF_L$) based on either of the engine exhaust temperature estimation models represented in equations (1) and (2), and to provide the $FF_L$ value along with the default start-of-injection value SOI to a fueling determination block 156. Fueling determination block 156 is responsive to the $FF_L$ and SOI values to compute an exhaust temperature-limited fueling command value ($FC_{ETL}$), using known equations therefore, and to provide $FC_{ETL}$ to the MIN block 38 of FIG. 1.

In the embodiment illustrated in FIG. 5, the exhaust temperature fueling limiter block 24" is operable to limit the default mass fuel flow value FF to a limited value $FF_L$, based on a desired exhaust temperature limit value $T_{EL}$ and on either of the engine exhaust temperature estimation models represented by equations (1) and (2). The $FF_L$ value and the start-of-injection value SOI are then recombined at the fueling determination block 156 to produce the exhaust temperature-limited fueling command value $FC_{ETL}$. The minimum value of the exhaust temperature-limited fueling command $FC_{ETL}$ and the default fueling command DFC is produced by control circuit 20 as the final fueling command FFC on signal path 42. The fuel system 40 is responsive to the final fueling command FFC to correspondingly supply fuel to engine 12, and the temperature of engine exhaust is thereby limited to a maximum value of $T_{EL}$.

Figure 6:
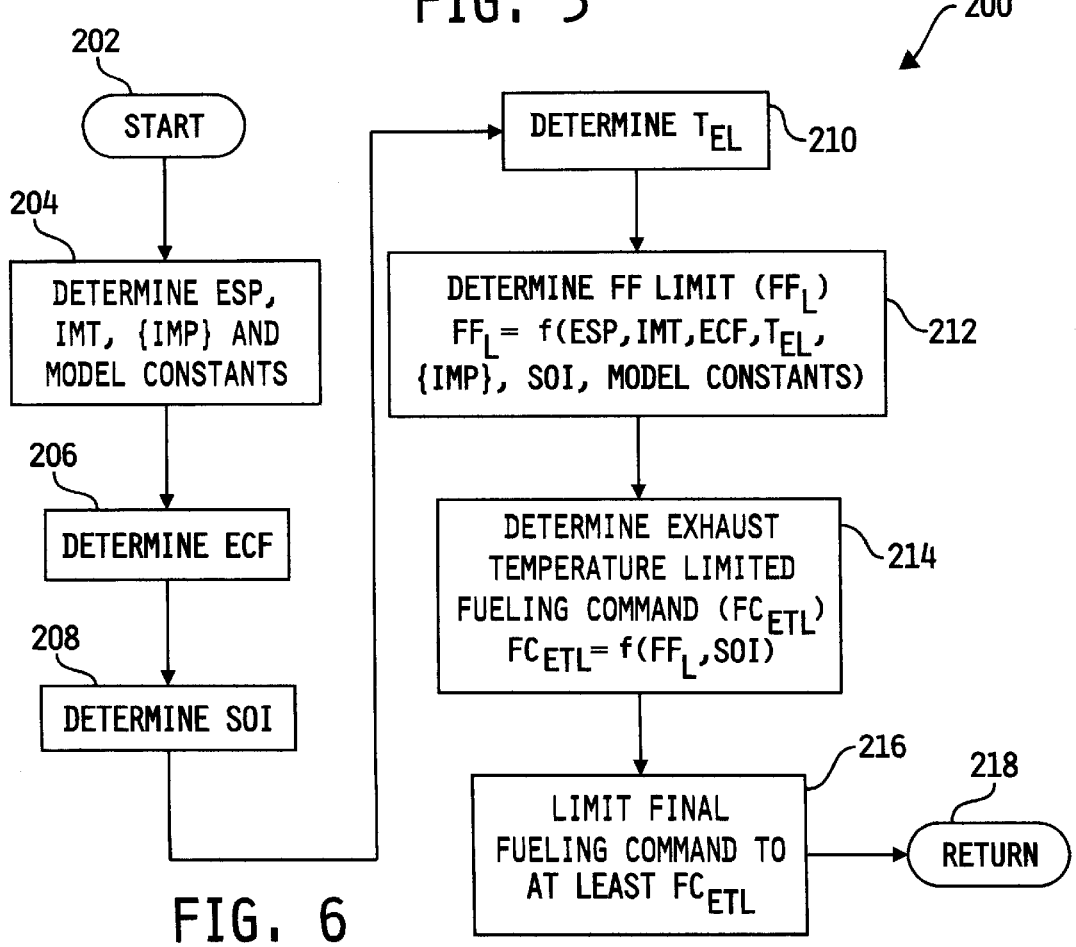
FIG. 6 is a flowchart illustrating one preferred embodiment of a software algorithm for controlling exhaust gas according to the exhaust temperature fueling limiter embodiment shown in FIG. 5.

Referring now to FIG. 6, one preferred embodiment of a software algorithm 200 for carrying out the concepts illustrated and described with respect to FIG. 5, is shown. Algorithm 200 begins at step 202, and thereafter at step 204 the fueling parameter limit determination block 150 is operable to determine ESP and IMT (and optionally IMP) from the respective sensors, and to determine the model constants from block 152. In embodiments utilizing the engine exhaust temperature estimate model of equation (1), the model constants preferably include constants A, B, C, D and E thereof. Conversely, in embodiments utilizing the engine exhaust temperature estimate model of equation (2), the model constants preferably include constants A, B, C and D, as well as the lower heating value of fuel constant LHV thereof. In any case, algorithm execution advances from step 204 to step 206 where block 150 is operable to receive the mass charge flow value ECF either from a charge flow estimation algorithm such as that illustrated in FIG. 2, or from a mass air flow sensor such as sensor 44 shown in phantom in FIG. 1. Algorithm execution advances from step 206 to step 208 where the fueling parameter limit determination block 150 is operable to determine the default start-of-injection value SOI. In one embodiment, block 150 is operable at step 206 to receive SOI directly from the default fueling determination block 34 as shown in phantom in FIG. 5. Alternatively, block 150 may be operable at step 206 to receive the default fueling value DFC from block 34 and compute SOI therefrom using known techniques therefore. Thereafter at step 210, the fueling parameter limit determination block 150 is operable to determine an exhaust temperature limit $T_{EL}$, preferably by receiving $T_{EL}$ from block 154.

Following step 210, algorithm execution advances to step 212 where the fueling parameter limit determination block 150 is operable to determine the mass fuel flow limit $FF_L$ as a function of the various input signals and values thereto. In embodiments where the engine exhaust temperature is estimated in accordance with equation (1), the estimated exhaust temperature value ETE is preferably replaced with the exhaust temperature limit $T_{EL}$, and equation (1) is solved for $FF_L$, resulting in the equation:

$$FF_L = [T_{EL} - IMT - A - BISOI - (D*SOI)/ESP]/[(C*ESP) + E]/ECF \quad (5).$$

In embodiments where the engine exhaust temperature is estimated in accordance with equation (2), the estimated exhaust temperature value ETE is preferably replaced with the exhaust temperature limit $T_{EL}$, and equation (2) is solved for $FF_L$, resulting in the equation:

$$FF_L = (IMT*ECF)/T_{EL} + [(A*ESP) + (B*IMP) + (C*SOI) + D](ECF*LHV)/T_{EL} \quad (6).$$

In either case, algorithm execution advances from step 212 to step 214 where block 156 is operable to determine an exhaust temperature-limited fueling command $FC_{ETL}$ as a function of SOI and $FF_L$, using known techniques therefore. Thereafter at step 216, control circuit 20 is operable to limit the final fueling command FFC to a fueling command no greater than $FC_{ETL}$ to thereby limit the actual engine exhaust temperature to values no greater than $T_{EL}$. Algorithm execution advances from step 216 to step 218 where algorithm 200 is returned to its calling routine.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, while the invention has been illustrated and described as limiting a final engine fueling command (FFC) by computing either a start-of-injection limit ($SOI_L$) or a mass fuel flow limit ($FF_L$) and using the default value for the remaining parameter, the present invention contemplates embodiments of the present invention wherein FFC is limited by computing both $SOI_L$ and $FF_L$. As a specific example, an alternate embodiment of the present invention may use a default value for a third fueling parameter that goes into the final fueling calculation (e.g., peak cylinder pressure). In this case, two fuel limiting equations are then solved for the two unknown parameters $SOI_L$ and $FF_L$.

What is claimed is:

1. A system for determining engine exhaust temperature, comprising:
    a temperature sensor producing a temperature signal (IMT) corresponding to a temperature of an intake manifold of an internal combustion;
    an engine speed sensor producing an engine speed signal (ESP) corresponding to a rotational speed of said engine;
    means for determining a charge flow value (ECF) corresponding to a mass flow of charge entering said intake manifold; and
    a control circuit producing a fueling command for fueling said engine, said control circuit responsive to said fueling command, said temperature signal, said engine speed signal and said charge flow value to estimate an engine exhaust temperature (ETE).

2. The system of claim 1 wherein said control circuit is operable to determine start of injection (SOI) and mass fuel flow (FF) values corresponding to said fueling command.

3. The system of claim 2 further including a memory unit having constants A, B, C, D and E stored therein.

4. The system of claim 3 wherein said control circuit is operable to estimate said exhaust temperature according to the equation:

$$ETE = IMT + A + (B*SOI) + C/(ECF/FF) + (D*SOI)/ESP + E/[(ESP*ECF)/FF].$$

5. The system of claim 1 further including a pressure sensor producing a pressure signal corresponding to intake manifold pressure;
    and wherein said control circuit is further responsive to said pressure signal to estimate said engine exhaust temperature.

6. The system of claim 5 wherein said control circuit is operable to determine start of injection (SOI) and mass fuel flow (FF) values corresponding to said fueling command.

7. The system of claim 6 further including a memory unit having constants A, B, C and D and a lower heating value of fuel constant (LHV) stored therein.

8. The system of claim 7 wherein said control circuit is operable to estimate said exhaust temperature according to the equation:

$$ETE = IMT + [(A*ESP) + (B*IMP) + (C*SOI) + D][(LHV*FF)/ECF].$$

9. A method for determining engine exhaust temperature, comprising:
    determining a temperature (IMT) of an intake manifold of an internal combustion engine;
    determining a rotational speed (ESP) of said engine;
    determining a mass flow of charge (ECF) entering said intake manifold determining a fueling command for supplying fuel to said engine; and
    estimating an engine exhaust temperature (ETE) based on current values of said fueling command, said temperature, said rotational speed and said mass flow.

10. The method of claim 9 wherein the step of determining a fueling command includes determining start of injection (SOI) and mass fuel flow (FF) values corresponding to said fueling command.

11. The method of claim 10 further including the step of determining a number of constants A, B, C, D and E.

12. The method of claim 11 wherein the estimating step includes estimating said exhaust temperature according to the equation:

$$ETE = IMT + A + (B*SOI) + C/(ECF/FF) + (D*SOI)/ESP + E/[(ESP*ECF)/FF].$$

13. The method of claim 9 further including the step of determining a pressure within said intake manifold (IMP);
    and wherein the estimating step further includes estimating said exhaust temperature further based on a current value of said pressure.

14. The method of claim 13 wherein the step of determining said fueling command includes determining start of injection (SOI) and mass fuel flow (FF) values corresponding to said fueling command.

15. The method of claim 14 further including the step of determining a number of constants A, B, C and D and a lower heating value of fuel constant (LHV).

16. The method of claim 15 wherein the estimating step includes estimating said exhaust temperature according to the equation:

$$ETE = IMT + [(A*ESP) + (B*IMP) + (C*SOI) + D][(LHV*FF)/ECF].$$

* * * * *